United States Patent
Yagami

(10) Patent No.: US 10,295,846 B2
(45) Date of Patent: May 21, 2019

(54) LIGHT EMITTING DEVICE AND LIGHT EMITTING METHOD

(71) Applicant: SONY SEMICONDUCTOR SOLUTIONS CORPORATION, Kanagawa (JP)

(72) Inventor: Kojiro Yagami, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/763,934

(22) PCT Filed: Sep. 29, 2016

(86) PCT No.: PCT/JP2016/078751
§ 371 (c)(1),
(2) Date: Mar. 28, 2018

(87) PCT Pub. No.: WO2017/065011
PCT Pub. Date: Apr. 20, 2017

(65) Prior Publication Data
US 2018/0275432 A1    Sep. 27, 2018

(30) Foreign Application Priority Data
Oct. 13, 2015 (JP) .................................. 2015-201791

(51) Int. Cl.
*F21K 9/64* (2016.01)
*F21V 9/00* (2018.01)
(Continued)

(52) U.S. Cl.
CPC .............. *G02F 1/0121* (2013.01); *F21K 9/64* (2016.08); *F21V 9/00* (2013.01); *G02F 1/0126* (2013.01); *G02F 2/02* (2013.01); *G02B 5/003* (2013.01); *G02F 1/00* (2013.01)

(58) Field of Classification Search
CPC . G02F 1/00; G02F 1/01; G02F 1/0121; G02F 1/0126; G02F 1/03; G02F 1/07;
(Continued)

(56) References Cited

U.S. PATENT DOCUMENTS 8,480,958 B2 * 7/2013 Gomez Rivas .... G01N 21/6428
422/82.07
9,157,605 B2 * 10/2015 Rodriguez .............. H01L 33/50
(Continued)

FOREIGN PATENT DOCUMENTS

CN    105409015 A    3/2016
EP    3031085 A1    6/2016
(Continued)

OTHER PUBLICATIONS

International Search Report and Written Opinion of PCT Application No. PCT/JP2016/078751, dated Dec. 27, 2016, 07 pages.
(Continued)

*Primary Examiner* — Loha Ben
(74) *Attorney, Agent, or Firm* — Chip Law Group

(57) ABSTRACT

The present technology relates to a light emitting device and a light emitting method which readily emit high intensity light. Unipolar noise is applied to a plurality of rod-shaped metal antennas of a light emission mechanism including the plurality of metal antennas, radiating light by oscillation of electrons in the metal antennas caused by incident light. The present technology can be applied to a device for emitting light, such as an illumination device, for example.

8 Claims, 16 Drawing Sheets

(51) Int. Cl.
*G02F 1/00* (2006.01)
*G02F 1/01* (2006.01)
*G02F 2/02* (2006.01)
*G02B 5/00* (2006.01)

(58) Field of Classification Search
CPC ..... G02F 1/35; G02F 2/00; G02F 2/02; G02F 2002/08; H01S 5/005; H01S 5/0085; H01L 33/50; H01L 33/502; H01L 33/508; H01L 33/58; F21V 9/00; F21V 9/08; F21V 9/30; G02B 5/00; G02B 5/003; G02B 5/008; G02B 5/18; H01J 1/00; H01J 3/00; H01J 3/08; F21K 9/00; F21K 9/60; F21K 9/64; G01N 21/6402; G01N 21/6428; G01N 21/6452; G01N 21/648; G01N 2021/6441
USPC ....... 359/238, 240, 241, 242, 244, 245, 279, 359/325, 330, 332; 250/458.1, 461.1, 250/492.1, 493.1, 494.1, 503.1, 505.1; 257/98; 362/84; 436/172; 73/570, 73/570.5, 579; 977/700, 762, 902
See application file for complete search history.

(56) References Cited

U.S. PATENT DOCUMENTS

| | | | |
|---|---|---|---|
| 9,244,268 B2* | 1/2016 | Long | G02F 1/0126 |
| 9,274,352 B2* | 3/2016 | Long | G02F 1/0126 |
| 9,416,927 B2* | 8/2016 | Rodriguez | H01L 33/50 |
| 9,982,850 B2* | 5/2018 | Rodriguez | H01L 33/50 |
| 2016/0161644 A1 | 6/2016 | Verschuuren et al. | |

FOREIGN PATENT DOCUMENTS

| | | |
|---|---|---|
| JP | 2016-534554 A | 11/2016 |
| KR | 10-2016-0041997 A | 4/2016 |
| WO | 2013/065751 A1 | 5/2013 |
| WO | 2015/019229 A1 | 2/2015 |

OTHER PUBLICATIONS

Aida, et al., "Experiment on Synchronization of Semiconductor Lasers by Common Injection of Constant-Amplitude Random-Phase Light", Optics Express 11813, vol. 20, No. 11, May 21, 2012, 17 pages.

* cited by examiner

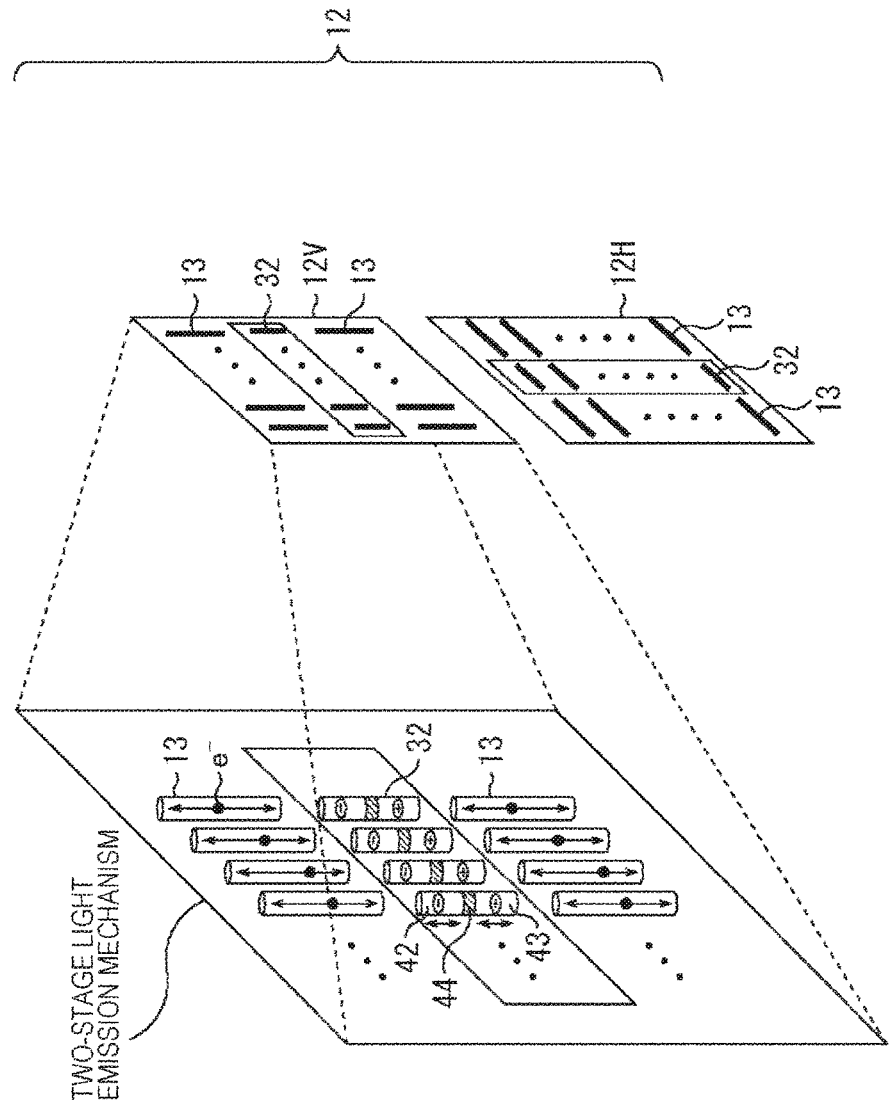

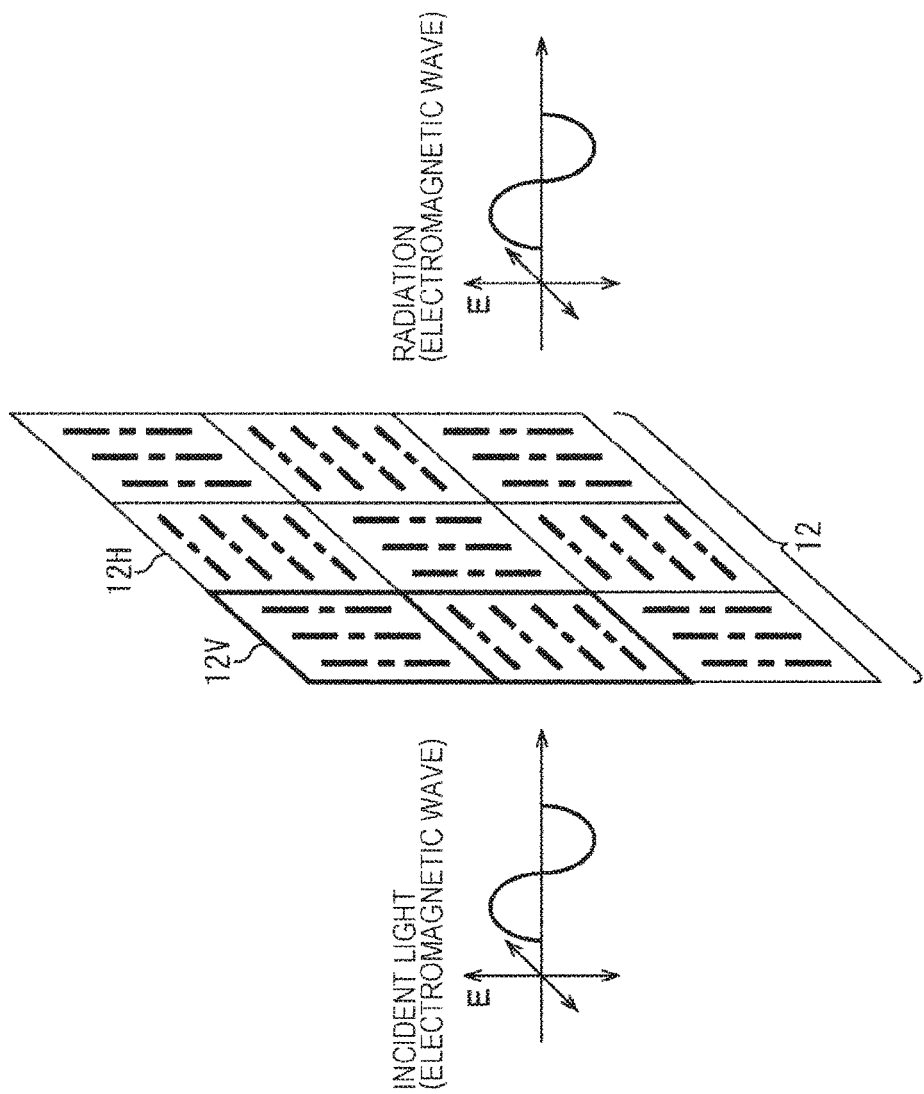

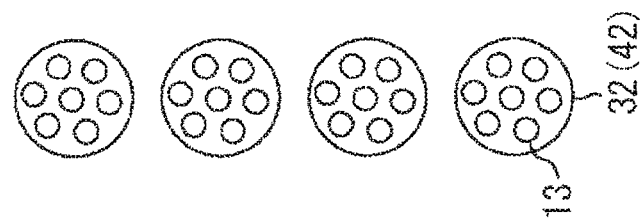
FIG. 16E
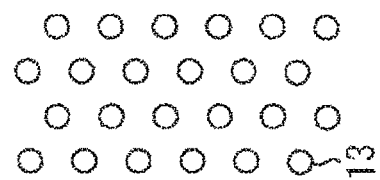
FIG. 16D
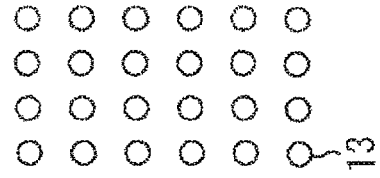
FIG. 16C
FIG. 16B
FIG. 16A

LIGHT EMITTING DEVICE AND LIGHT EMITTING METHOD

CROSS REFERENCE TO RELATED APPLICATIONS

This application is a U.S. National Phase of International Patent Application No. PCT/JP2016/078751 filed on Sep. 29, 2016, which claims priority benefit of Japanese Patent Application No. JP 2015-201791 filed in the Japan Patent Office on Oct. 13, 2015. Each of the above-referenced applications is hereby incorporated herein by reference in its entirety.

TECHNICAL FIELD

The present technology relates to a light emitting device and a light emitting method, and particularly to a light emitting device and a light emitting method which readily emit high intensity light.

BACKGROUND ART

A method for achieving a strong light source, that is, a light source emitting high intensity light includes, for example, a method of concentrating light by using a lens or mirror, a method using a laser beam, a method of increasing energy to a light source to increase the amount of light emitted and the like.

However, the method of concentrating light by using a lens or mirror spatially concentrate light to increase the intensity, requiring a proper spatial volume, that is, for example, a large lens or a large mirror. The method using a laser beam provides a beam emitted, limited in wavelength. The method of increasing energy to a light source, for example, requires an increased voltage or current supplied to a light source, but it is generally difficult for a user to increase the voltage or current supplied to the light source.

Here, a technology called common noise-induced phase synchronization has been proposed, by which a suitable noise is applied to a signal system from outside to synchronize the phases of the signal system (e.g., see Non-Patent Document 1).

CITATION LIST

Non-Patent Document

Non-Patent Document 1: Utagawa A., Asai T., Hirose T., and Amemiya Y., "Noise-induced synchronization among sub-RF CMOS analog oscillators for skew-free clock distribution," IEICE Transactions on Fundamentals of Electronics, Communications and Computer, vol. E91-A, no. 9, pp. 2475-2481 (2008).

SUMMARY OF THE INVENTION

Problems to be Solved by the Invention

In recent years, proposal of a technology which readily achieves a light source for emitting high intensity light without changing an original light source has been required.

The present technology has been made in view of such circumstances, and facilitates emission of high intensity light.

Solutions to Problems

A light emitting device according to the present technology is a light emitting device which includes a light emission mechanism and a unipolar noise output unit. The light emission mechanism includes a plurality of rod-shaped metal antennas to radiate light obtained by oscillation of electrons in the metal antennas caused by incident light. The unipolar noise output unit applies unipolar noise to the metal antennas.

A light emitting method according to the present technology is a light emitting method which includes applying unipolar noise to a plurality of rod-shaped metal antennas of a light emission mechanism including the metal antennas to radiate light obtained by oscillation of electrons in the metal antennas caused by incident light.

In the light emitting device and the light emitting method according to the present technology, unipolar noise is applied to the plurality of metal antennas of the light emission mechanism configured to radiate light obtained by oscillation of electrons in the metal antennas caused by incident light.

It should be note that the light emitting device may be an independent device or may be an internal block constituting a single device.

Effects of the Invention

According to the present technology, high intensity light can be readily emitted.

Note that, the present technology is not necessarily limited to the effect described here, and may have any effect described in the present disclosure.

BRIEF DESCRIPTION OF DRAWINGS

FIG. 14 is a diagram illustrating a third exemplary configuration of the light emission mechanism 12 including a plurality of metal antennas 13.

FIG. 15 is a diagram illustrating a fourth exemplary configuration of the light emission mechanism 12 including a plurality of metal antennas 13.

FIGS. 16A, 16B, 16C, 16D, and 16E are plan views of exemplary arrangement patterns of a plurality of metal antennas 13 in the light emission mechanism 12.

MODE FOR CARRYING OUT THE INVENTION

<First Exemplary Configuration of Light Emitting Device Using Antenna Effect>

Figure 1:
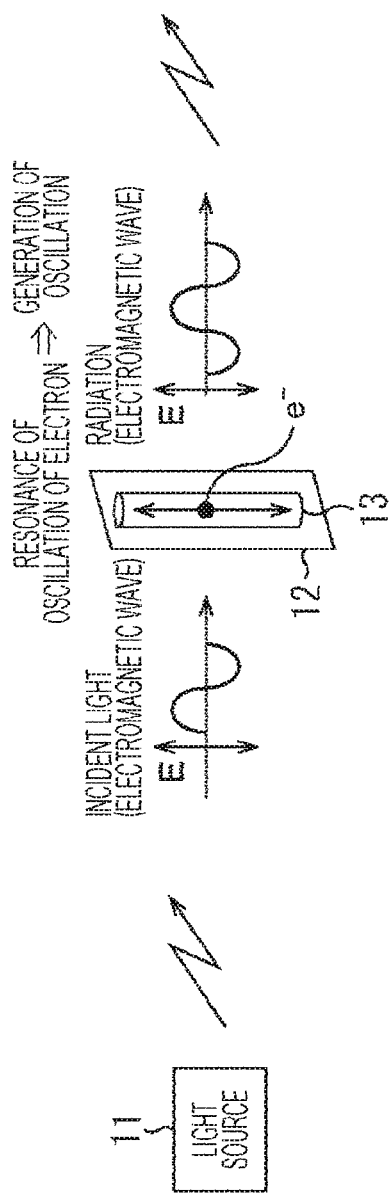
FIG. 1 is a diagram illustrating a first exemplary configuration of a light emitting device using an antenna effect.

FIG. 1 is a diagram illustrating a first exemplary configuration of a light emitting device using an antenna effect.

Here, the light emitting device, which is described below, can be applied to an illumination device, a light source of an analyzer (spectroscopic analyzer) for analyzing an object by spectroscopy, a light source of an image capture device such as an endoscope, a light source of a display device for displaying an image, a light source of a measurement device for measuring a distance, a light source for optical communication, a flashlight, or any other light emitting device for emitting light.

In FIG. 1, the light emitting device includes a light source 11 and a light emission mechanism 12.

Note that the light emitting device may be configured without the light source 11, and the light source 11 may be configured as a device different from the light emitting device.

The light source 11 emits an electromagnetic wave as light being incident light to be input to the light emission mechanism 12. The light emitted from the light source 11 is applied, as the incident light, to the light emission mechanism 12.

The light emission mechanism 12 radiates light in response to the incident light from the light source 11.

The light emission mechanism 12 includes one metal antenna 13. The metal antenna 13 is a nanometer-scale rod-shaped metal (nanoantenna).

Here, it is known that when an electromagnetic wave is emitted to a nanometer-scale metal, (optical) antenna effect causes absorption and emission (radiation) of the electromagnetic wave in the nanometer-scale metal.

The metal antenna 13 radiates light in response to the incident light from the light source 11 by antenna effect.

That is, an electron (free electron) in the metal antenna 13 is oscillated in the metal antenna 13 by an electric field of the incident light (electromagnetic wave) from the light source 11, and light having the same frequency as that of the incident light is radiated from the metal antenna 13.

Here, in a case where a resonance condition in which the oscillation of the electron in the metal antenna 13 resonates is satisfied, the oscillation of the electron is generated, and light of higher (optical) intensity is radiated from the metal antenna 13.

Furthermore, in a case where a direction of oscillation (amplitude) of the electric field of the incident light is aligned with a longitudinal direction of the metal antenna, in the same direction, the oscillation of the electron in the metal antenna 13 has a maximum amplitude, and light is radiated most efficiently in response to the incident light.

<Second Exemplary Configuration of Light Emitting Device Using Antenna Effect>

Figure 2:
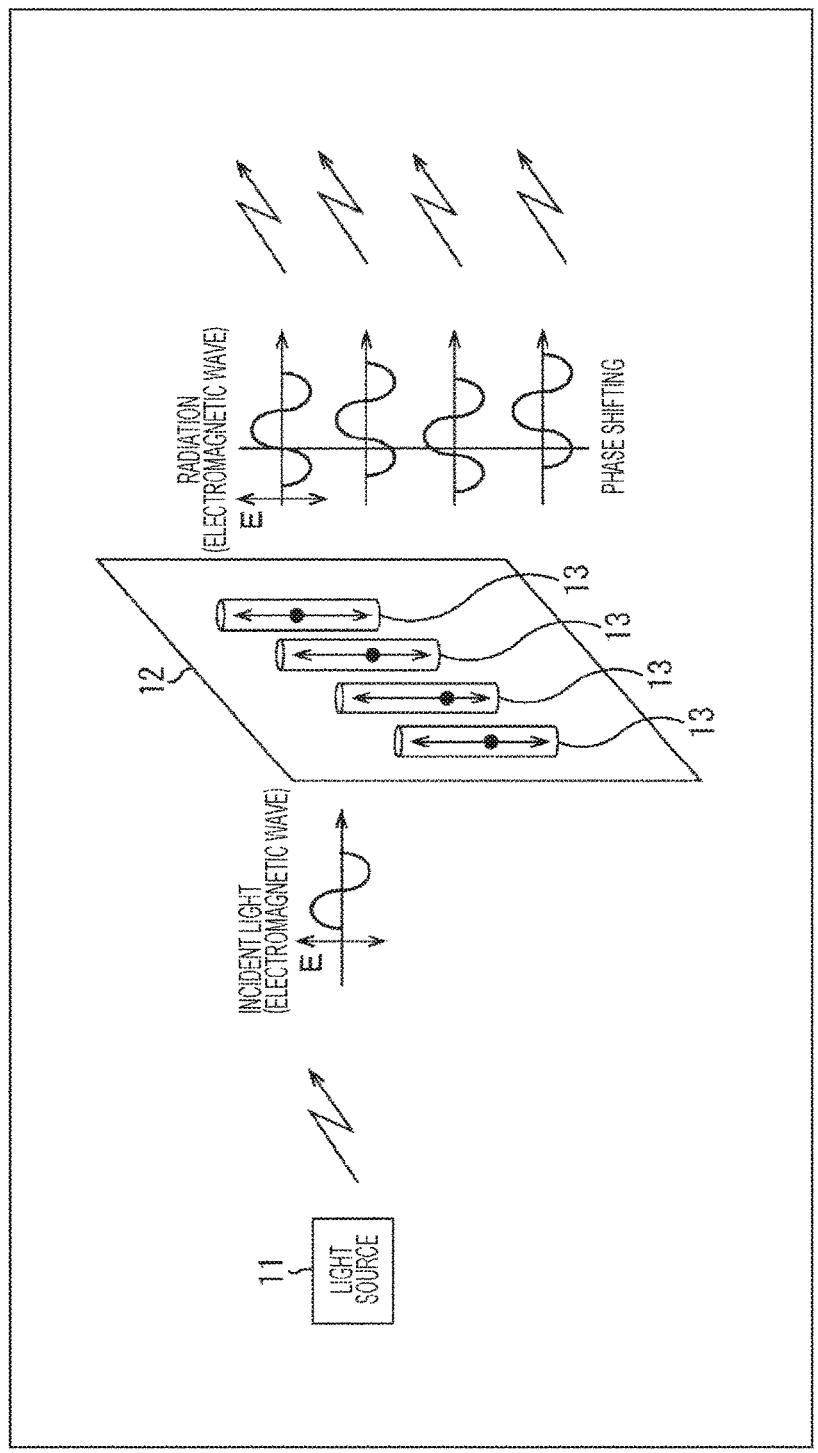
FIG. 2 is a diagram illustrating a second exemplary configuration of the light emitting device using an antenna effect.

FIG. 2 is a diagram illustrating a second exemplary configuration of the light emitting device using an antenna effect.

It should be noted that, in FIG. 2, portions corresponding to those of FIG. 1 are denoted by the same reference signs, and the description thereof will be appropriately omitted below.

The light emitting device of FIG. 2 is common to the light emitting device of FIG. 1 in that the light emitting device includes the light source 11 and the light emission mechanism 12.

However, the light emitting device of FIG. 2 is different from the light emitting device of FIG. 1 in that the light emission mechanism 12 of FIG. 2 includes a plurality of metal antennas 13, and the light emission mechanism 12 of FIG. 1 includes one metal antenna 13.

In the light emitting device of FIG. 2, the light emission mechanism 12 includes the plurality of, for example four, metal antennas 13. The four metal antennas 13 of the light emission mechanism 12 are horizontally arranged in line at equal intervals to have longitudinal directions which extend in the same direction and are aligned in height.

Here, in FIG. 2, the light emission mechanism 12 includes the plurality of, for example four, metal antennas 13, but the number of the plurality of metal antennas 13 provided in the light emission mechanism 12 is not limited to four, and may be two, three, or five or more. Furthermore, the plurality of four metal antennas 13 of the light emission mechanism 12 may not be arranged at equal intervals.

In the light emitting device of FIG. 2, the light emission mechanism 12 includes the plurality of metal antennas 13, and each metal antenna 13 radiates light in response to the incident light from the light source 11, as described above. Accordingly, the intensity of light emitted from the light emission mechanism 12 including such plurality of metal antennas 13 is larger than that of light emitted from the light emission mechanism 12 of FIG. 1.

Incidentally, an increase in the number of metal antennas 13 provided in the light emission mechanism 12 increases the amplification of light from the light emission mechanism 12, that is, the intensity of light emitted from the light emission mechanism 12, relative to the intensity of the incident light.

However, due to a minute variation or the like in size of the plurality of metal antennas 13 constituting the light emission mechanism 12, the oscillations of electrons in the respective metal antennas 13 may be out of phase (phase shifting).

In a case where the oscillations of the electrons in the respective metal antennas 13 are out of phase as described above, even if the number of metal antennas 13 provided in the light emission mechanism 12 is increased, it is difficult to increase the intensity of light (amplification) as in the laser beam, in response to the incident light to the light emission mechanism 12.

<Third Exemplary Configuration of Light Emitting Device Using Antenna Effect>

Figure 3:
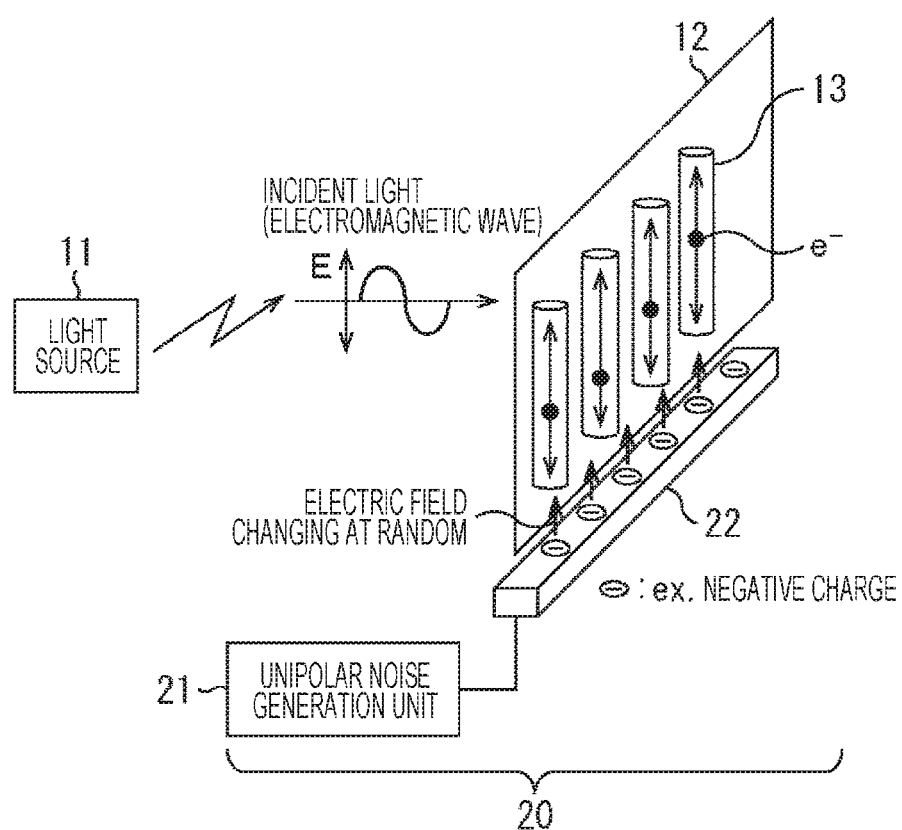
FIG. 3 is a diagram illustrating a third exemplary configuration of the light emitting device using an antenna effect.

FIG. 3 is a diagram illustrating a third exemplary configuration of the light emitting device using an antenna effect.

Note that, in FIG. 3, portions corresponding to those of FIG. 2 are denoted by the same reference signs, and the description thereof will be appropriately omitted below.

In FIG. 3, the light emitting device includes the light source 11, the light emission mechanism 12, and a unipolar noise output unit 20.

The light emitting device of FIG. 3 is common to the light emitting device of FIG. 2 in that the light emitting device includes the light source 11 and the light emission mechanism 12.

Furthermore, the light emitting device of FIG. 3 is common to the light emitting device of FIG. 2 in that the light emission mechanism 12 includes a plurality of metal antennas 13.

However, the light emitting device of FIG. 3 is different from the light emitting device of FIG. 2 in that the light emitting device of FIG. 3 includes the unipolar noise output unit 20 and the light emitting device of FIG. 2 does not include such a unipolar noise output unit 20.

The unipolar noise output unit 20 outputs unipolar noise being random noise having a positive or negative polarity, and applies the unipolar noise to the plurality of metal antennas 13 constituting the light emission mechanism 12.

That is, the unipolar noise output unit 20 generates electric fields, as the unipolar noise, which are changed to electric fields having a single polarity (positive or negative), by a random magnitude and at random time intervals, and applies the electric fields to the plurality of metal antennas 13.

FIG. 3 illustrates a first exemplary configuration of the unipolar noise output unit 20.

In FIG. 3, the unipolar noise output unit 20 includes a unipolar noise generation unit 21 and a metal bar 22.

The unipolar noise generation unit 21 generates a voltage as the unipolar noise, that is, for example, noise having negative polarity, and supplies the voltage to the metal bar 22.

The metal bar 22 is arranged below a plurality of metal antennas 13 aligned in line so that a longitudinal direction of the metal bar 22 is aligned with a direction in which the plurality of metal antennas 13 are aligned.

Here, each metal antenna 13 may include, for example, inexpensively processable Cu or Al, highly-conductive Au or Ag, or any other metal. Note that the metal antenna 13 may include a non-metal material having a free electron, but metal is appropriately used in consideration of oscillation generation efficiency of an electron (low resistance, high concentration of free electrons), industrial usability, and the like.

Furthermore, the size of the metal antenna 13 may have a longitudinal length which is, for example, approximately the wavelength of the incident light, and a diameter which is approximately 1/10 of the longitudinal length. For example, in a case where visible light is employed as the incident light, the metal antenna 13 having a rod shape may have a diameter which is, for example, approximately several tens of nanometers, and a longitudinal length which is, for example, approximately several microns (micrometers).

Furthermore, the size of the metal antenna 13 can be optimized in consideration of the incident light, a resonance condition of metal (oscillation of electrons in metal) used as the metal antenna 13, or the like.

Furthermore, a rod-shaped metal as the metal antenna 13 may have a bottom surface (cross-section) having a circular, polygonal, or any other shape.

Furthermore, the metal antenna 13 may have, for example, a flat plate shape or any other shape in which a free electron may be oscillated, in addition to the rod shape.

However, the metal antenna 13 desirably has a shape, such as a rod shape, having a unidirectional shape anisotropy. In a case where the metal antenna 13 employs a rod shape, the oscillation of electron in the metal antenna 13 can be restricted to the longitudinal direction of the rod shape. Furthermore, according to the metal antenna 13 having a rod shape, the incident light concentrated to a local area can be radiated. Thus, the metal antenna 13 having a rod shape is advantageous in conversion efficiency in converting the incident light to light radiated from the metal antenna 13.

Furthermore, the number of the plurality of metal antennas 13 provided in the light emission mechanism 12 is not limited to four as illustrated in FIG. 2, and may be two, three, or five or more. In accordance with the number of the plurality of metal antennas 13 provided in the light emission mechanism 12, the size of the light source for light radiated from the light emission mechanism 12 can be freely adjusted.

Figure 4:
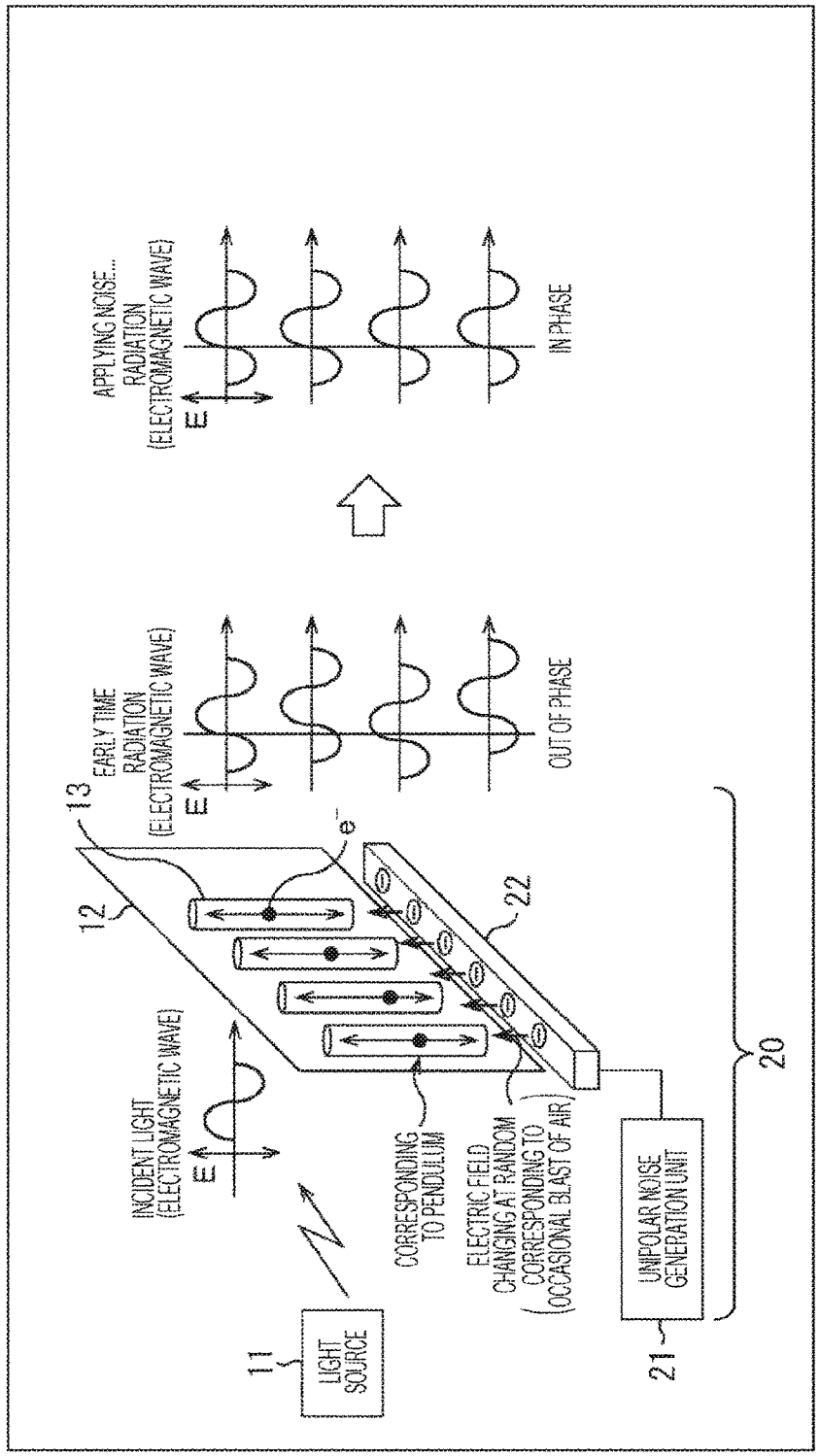
FIG. 4 is a diagram illustrating the operation of a light emitting device.

FIG. 4 is a diagram illustrating the operation of the light emitting device of FIG. 3.

In the light emitting device of FIG. 3, the respective metal antennas 13 of the light emission mechanism 12 have electrons ($e^-$) in the metal antennas 13, the electrons oscillate in response to the incident light from the light source 11, and light (electromagnetic wave) is radiated in accordance with the oscillations of the electrons, in a similar manner as illustrated in FIG. 2.

However, as illustrated in FIG. 2, the phase shifting is caused between the oscillations of electrons in the respective metal antennas 13. Therefore, a phase shifting is caused in light radiated from the metal antennas 13.

While, in the unipolar noise output unit 20, the unipolar noise generation unit 21 generates the unipolar noise, and the unipolar noise temporally modulates the density of an electric charge on a surface of the metal bar 22 at random. Thus, electric fields having an electric field intensity around the metal bar 22, temporally changing at random, and having a single polarity are applied as the unipolar noise to the plurality of metal antennas 13.

In each of the plurality of metal antennas 13, an electric field intensity at a lower end surface of the metal antenna 13 is affected by an electric field applied as the unipolar noise from the metal bar 22, and the electric field of the metal antenna temporally changes at random to have a single polarity.

The phase of oscillation of an electric charge in the metal antenna 13 is affected by the electric field intensity at the lower end surface of the metal antenna 13, caused by the unipolar noise, and the phase of oscillation of electric charge in the metal antenna 13 is modulated.

That is, the phase of oscillation of an electric charge in the metal antenna 13 is modulated by the unipolar noise.

According to this modulation by the unipolar noise, on the basis of the principle of common noise-induced phase synchronization, which is described later, the oscillations of electric charges in the metal antennas 13 are in phase (synchronized). Thus, light radiated from the respective metal antennas 13 are in phase, and as a whole of the light emission mechanism 12, the intensity of light emitted from the light emission mechanism 12 can be maximized, that is, the amplification of light from the light emission mechanism 12 can be maximized.

As described above, the unipolar noise is applied to a plurality of metal antennas 13 having a rod shape of the light emission mechanism 12 including the metal antennas 13 to radiate light obtained by oscillation of electrons in the metal antennas 13 caused by the incident light. Therefore, high intensity light can be readily emitted.

That is, the intensity of the incident light emitted from the light source 11 can be increased only by adding a simple device of the unipolar noise output unit 20 for applying the unipolar noise to each metal antenna 13, without changing the light source 11 an original light source.

Note that, in FIG. 3, the unipolar noise is applied to the lower end surface of each metal antenna 13, but the unipolar noise can be applied to an upper end surface of the metal antenna 13, in addition to the lower end surface of the metal antenna 13.

Furthermore, the light emitting device of FIG. 3 may be designed so that, for example, each metal antenna 13 generates plasmon resonance in response to the incident light. In this configuration, the metal antenna 13 enables local light concentration exceeding the diffraction limit of the incident light concentrated by a lens, and so-called super light concentration can be achieved together with the increase of the intensity of light caused by the oscillations of electric charges in the respective metal antennas 13 which are in phase with each other. Such super light concentration can achieve a light source emitting light having a size equal to the size of the metal antenna 13.

Figure 5:
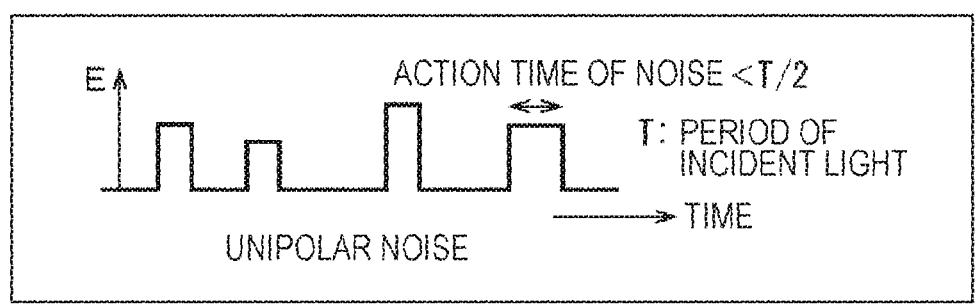
FIG. 5 is a diagram illustrating an exemplary electric field as unipolar noise applied to a metal antenna 13.

FIG. 5 is a diagram illustrating an exemplary electric field as the unipolar noise applied to a metal antenna 13.

The unipolar noise needs to be applied as noise to the oscillation of electrons in the metal antenna 13.

Therefore, an action time in which the unipolar noise continuously acts on the metal antenna 13 (oscillation of the electron in the metal antenna 13) is desirably a time being ½ or less of a period of the incident light (or less than ½ thereof), in particular, a time period sufficiently smaller than a time period being ½ or less of the period of the incident light, as illustrated in FIG. 5.

The action time in which the unipolar noise acts restricts the frequency of the incident light which can increase the amplification of light in the light emission mechanism 12 (hereinafter, also referred to as amplifiable incident light).

Here, the action time in which the unipolar noise acts is determined by a noise source (frequency of the noise source) being a source of the unipolar noise.

Accordingly, the frequency of the amplifiable incident light is restricted by the noise source.

For example, in a case where an X-ray having a frequency of approximately $10^{18}$ Hz is used as the noise source, an electromagnetic wave having a frequency of not more than approximately $10^{17}$ Hz, which is the frequency of an ultraviolet ray, (e.g., visible light, infrared light, or the like) is the amplifiable incident light. Furthermore, for example, in a case where the visible light having a frequency of approximately $10^{14}$ Hz to $10^{15}$ Hz is used as the noise source, an electromagnetic wave having a frequency of not more than $10^{13}$ Hz (e.g., an electromagnetic wave in the THz range) is the amplifiable incident light.

Note that, for example, continuous light can be used as the noise source. Furthermore, pulsed light, such as femtosecond laser pulse, for example, can be used as the noise source, in addition to the continuous light.

<Principle of Common Noise-Induced Phase Synchronization>

Figure 6:
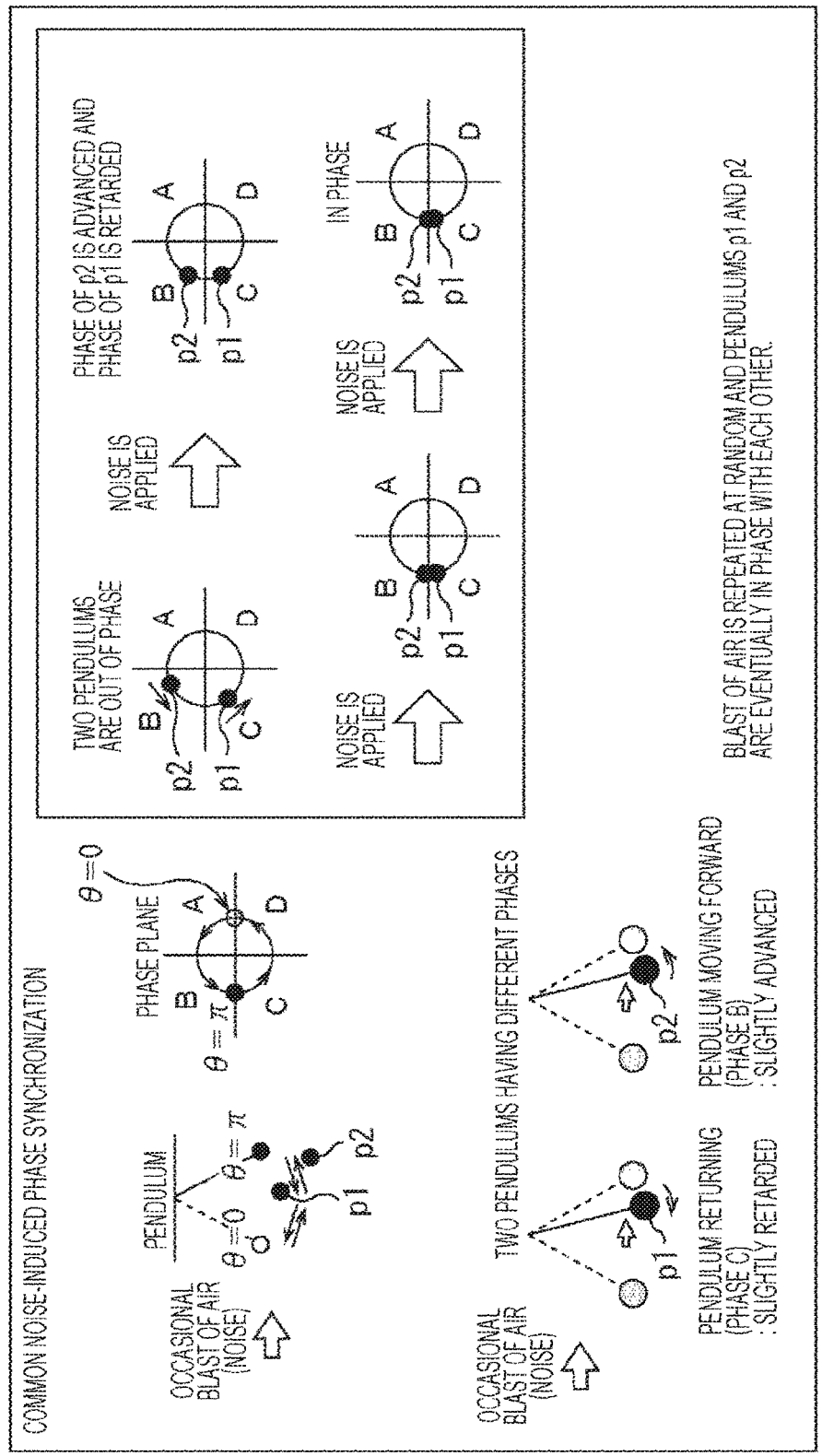
FIG. 6 is a diagram illustrating the principle of common noise-induced phase synchronization.

FIG. 6 is a diagram illustrating the principle of the common noise-induced phase synchronization described in Non-Patent Document 1.

In FIG. 6, two pendulums p1 and p2 having the same specification are arranged in line, and oscillate in a horizontal direction in FIG. 6. Furthermore, the oscillations of the pendulums p1 and p2 are out of phase.

Here, in FIGS. 6, A, B, C, and D represent phases on a phase plane of the pendulums, and represent phases in a first quadrant, a second quadrant, a third quadrant, and a fourth quadrant of the phase plane, respectively.

Now, the pendulum p1 is in phase C and on the way to an equilibrium position (point), and the pendulum p2 is in phase B and on the way from the equilibrium position.

When a blast of air is applied in one direction (from left side in FIG. 6) to the two pendulums p1 and p2, the blast of air acts on the two pendulums p1 and p2 as described below.

That is, a force acts on the pendulum p1 on the way to the equilibrium to push back the pendulum p1 in a direction opposite to a direction in which the pendulum p1 returns, and the phase of the pendulum P1 is slightly retarded. In contrast, a force acts on the pendulum p2 on the way from the equilibrium position in a direction the same as a direction in which the pendulum p2 moves away, and the phase of the pendulum p2 is slightly advanced.

Accordingly, when a blast of air is sometimes applied in one direction to the two pendulums p1 and p2, the blast of air acts on the pendulums p1 and p2 as described above, and eventually, the pendulums p1 and p2 are in phase with each other.

As described above, owing to a blast of air sometimes applied to the pendulums p1 and p2 out of phase with each other, the pendulums p1 and p2 are synchronized in phase. This is the principle of the common noise-induced phase synchronization.

Here, to synchronize the pendulums p1 and p2 in phase by the common noise-induced phase synchronization, the blast of air needs to blow only in one direction. Furthermore, the blast of air needs to serve as perturbation so that the periodic oscillations of the pendulums p1 and p2 are not altered.

Accordingly, the blast of air is required to have a magnitude which is sufficiently smaller than the amplitudes of the pendulums p1 and p2, and to have an action time (a time period in which a blast of air continuously blows) which is (sufficiently) smaller than ½ of periods of the pendulums p1 and p2.

In Non-Patent Document 1, the technology of the common noise-induced phase synchronization is described to apply appropriate noise, which corresponds to the blast of air as described above, to signal systems from outside to synchronize the phases of the signal systems.

In the present technology, this common noise-induced phase synchronization is applied to the oscillations of electrons in the metal antennas 13 to synchronize the oscillations of electrons in phase, and further synchronize light radiated from respective metal antennas 13 in phase, increasing the intensity of light emitted from the light emission mechanism 21 including a plurality of metal antennas 13.

Thus, the present technology enables achievement of a so-called bare laser beam emitting light of different wavelengths, that is, enables emission of high-intensity light in phase without using a solid-state material (cavity), by common noise-induced phase synchronization.

<Exemplary Configuration of Unipolar Noise Output Unit 20>

Figure 7:
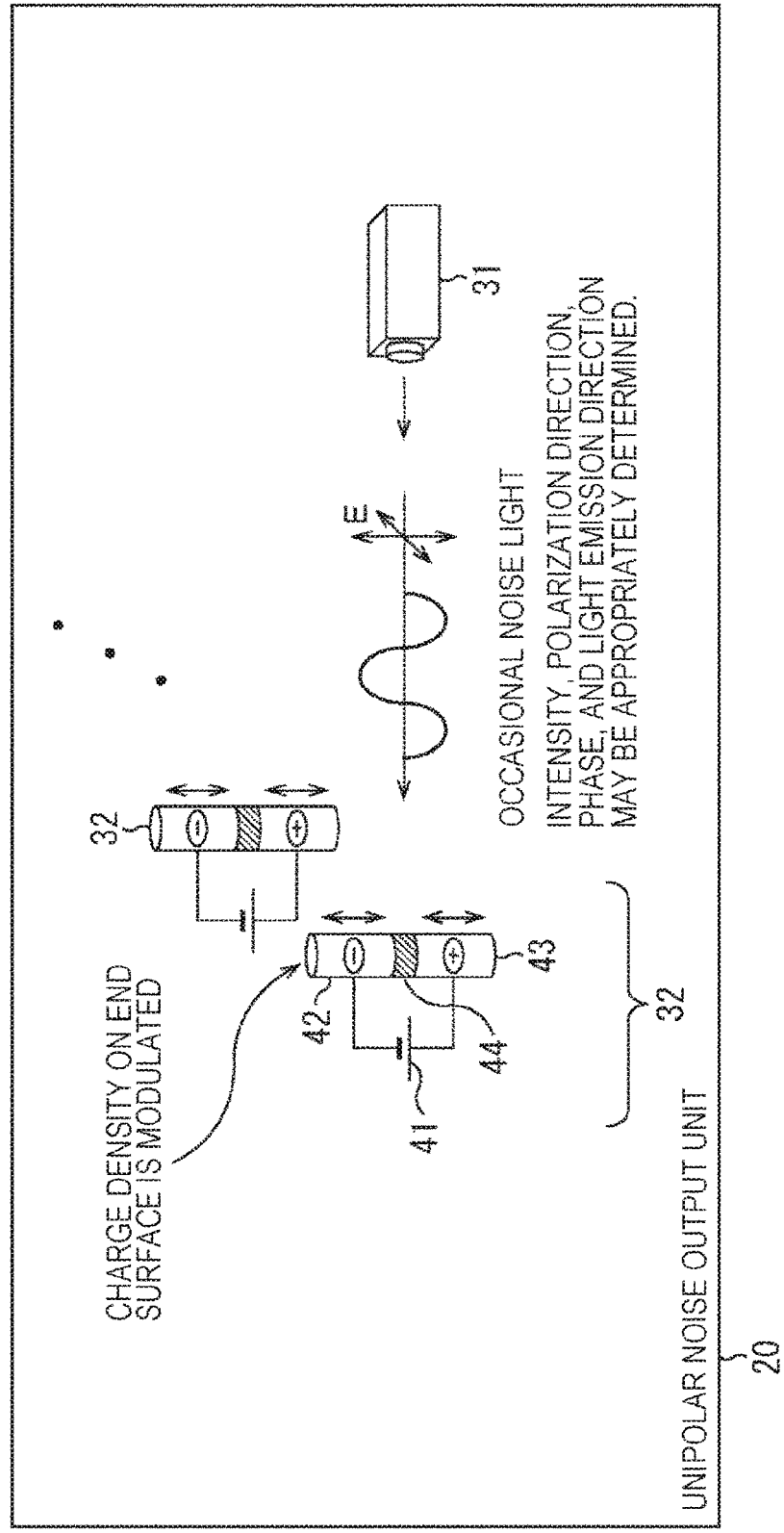
FIG. 7 is a diagram illustrating a second exemplary configuration of a unipolar noise output unit 20.

FIG. 7 is a diagram illustrating a second exemplary configuration of the unipolar noise output unit 20.

In FIG. 7, the unipolar noise output unit 20 includes a random electromagnetic wave generation unit 31 and a plurality of unipolar noise output mechanisms 32.

The random electromagnetic wave generation unit 31 generates an electromagnetic wave at random (random electromagnetic wave), and outputs the electromagnetic wave as noise light.

The random electromagnetic wave generation unit 31 includes, for example, a pulsed X-ray emitter in cooperation with a random number generator or the like. The intensity of the noise light emitted from the random electromagnetic wave generation unit 31, a light emission direction in which the noise light is emitted to the unipolar noise output mechanism 32, a polarization direction of the noise light, and the phase of the noise light may be determined at random, and no control is required.

Here, the random electromagnetic wave emitted from the random electromagnetic wave generation unit 31 is an electromagnetic wave having an electric field oscillatable to any of positive polarity and negative polarity. Therefore, even if the random electromagnetic wave emitted from the random electromagnetic wave generation unit 31 is directly emitted to a metal antenna 13, no unipolar noise is applied to the metal antenna 13. Accordingly, the principle of common noise-induced phase synchronization does not function, and oscillations of electric charges in the respective metal antennas 13 are out of phase.

The number of unipolar noise output mechanisms 32 to be provided is the same as the number of, for example, the plurality of metal antennas 13 of the light emission mechanism 12. A unipolar noise output mechanism 32 is arranged above or below, for example, below a metal antenna 13. Accordingly, the metal antenna 13 is arranged near a conductor 42, one of conductors 42 and 43 constituting the unipolar noise output mechanism 32, and the conductors 42 and 43 are described later.

The unipolar noise output mechanism 32 is irradiated with the noise light output from the random electromagnetic wave generation unit 31. The unipolar noise output mechanism 32 outputs an electric field as the unipolar noise in accordance with irradiation with the noise light, and applies the electric field to the metal antenna 13.

The unipolar noise output mechanism 32 includes a battery 41, the conductors 42 and 43, and a dielectric 44.

The unipolar noise output mechanism 32 has a capacitor structure in which the dielectric 44 is held between the conductors 42 and 43 each having a short rod shape, a negative terminal of the battery 41 is connected to the conductor 42, and a positive terminal of the battery 41 is connected to the conductor 43.

Here, the conductor 42 of the unipolar noise output mechanism 32 is also referred to as an upper conductor 42, and the conductor 43 is also referred to as a lower conductor 43.

In the unipolar noise output unit 20 configured as described above, the noise light output from the random electromagnetic wave generation unit 31 is emitted, as noise excitation light for energizing the unipolar noise, to the unipolar noise output mechanism 32.

In the unipolar noise output mechanism 32, in accordance with irradiation with the noise light, an electric charge in the upper conductor 42 and the lower conductor 43 of the capacitor structure oscillates at random to modulate charge densities on end surfaces of the upper conductor 42 and the lower conductor 43.

Thus, electric field intensities of the electric fields generated from the end surfaces of the upper conductor 42 and lower conductor 43 are modulated at random.

Here, as described above, in the unipolar noise output mechanism 32, the charge densities on the end surfaces of the upper conductor 42 and the lower conductor 43 are modulated in accordance with the noise light output from the random electromagnetic wave generation unit 31. Accordingly, it can be said that the noise light output from the random electromagnetic wave generation unit 31 is a random electromagnetic wave for modulating a charge density at an end surface of the unipolar noise output mechanism 32.

In the unipolar noise output mechanism 32, the upper conductor 42 and the lower conductor 43 are connected to the negative terminal and positive terminal of the battery 41, respectively.

Therefore, the electric field generated at random from the end surface of the upper conductor 42 is an electric field of negative polarity, and the electric field generated at random from the end surface of the lower conductor 43 is an electric field of positive polarity.

That is, the electric field of negative polarity, as the unipolar noise, is output from the upper conductor 42, and the electric field of positive polarity, as the unipolar noise, is output from the lower conductor 43.

In the unipolar noise output unit 20, the unipolar noise output from the upper conductor 42 is applied, as the occasional blast of air illustrated in FIG. 6, to the metal antenna 13.

Here, in the unipolar noise output unit 20, the random electromagnetic wave generation unit 31 uniformly emits the noise light to each of the plurality of unipolar noise output mechanisms 32. Thus, the random electromagnetic wave generation unit 31 oscillates electric charges in the conductors 42 (43) of the respective unipolar noise output mechanisms 32, in synchronization with each other, and outputs the electric fields having the same pattern, as the unipolar noise, from the conductors 42 of the respective unipolar noise output mechanisms 32.

Note that the unipolar noise output unit 20 can design the conductor 42 (43) to cause plasmon resonance in a case where the noise light output from the random electromagnetic wave generation unit 31 is emitted to the unipolar noise output mechanism 32. In this case, efficiency in generation of an electric field as the unipolar noise in the unipolar noise output mechanism 32 can be increased.

Furthermore, an electric charge for modulating charge density to cause the conductor 42 (43) to output an electric field as the unipolar noise may be any of a negative charge and a positive charge.

Figure 8:
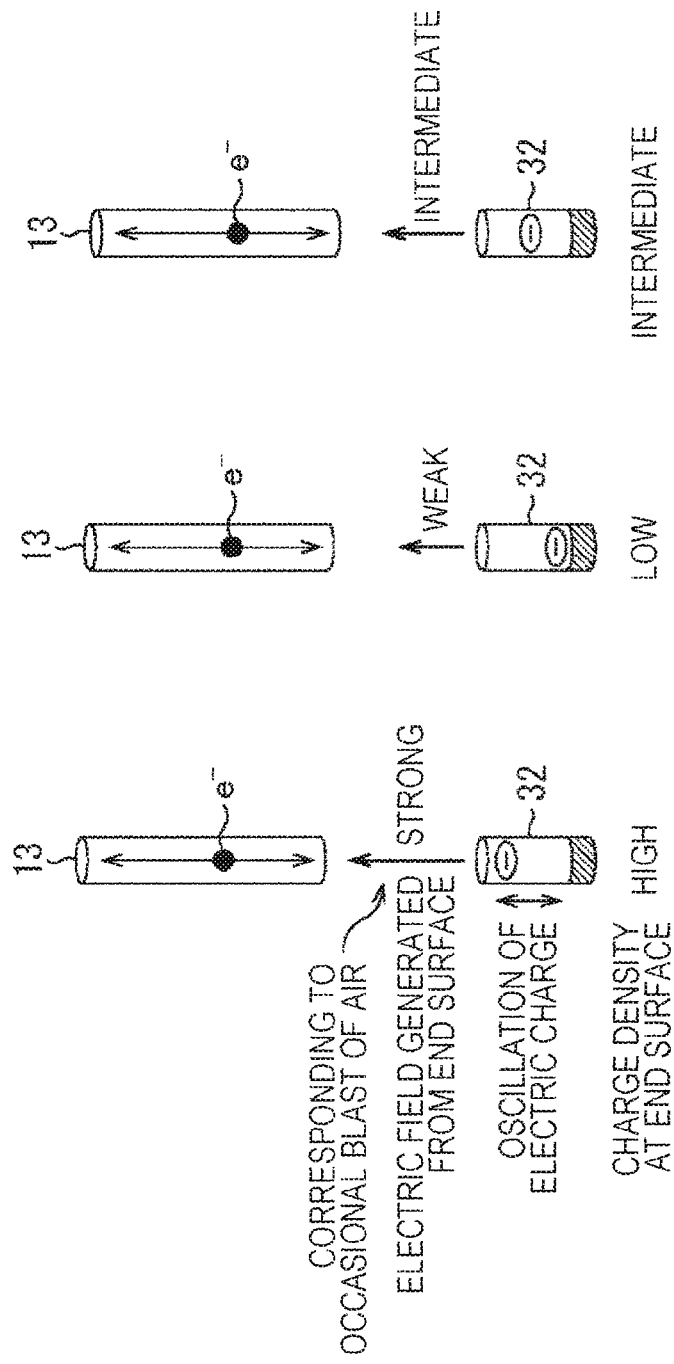
FIGS. 8A, 8B, and 8C are diagrams illustrating the magnitude of an acting force in a case where an electric field as unipolar noise output from a unipolar noise output mechanism 32, acting on an electric charge in the metal antenna 13.

FIGS. 8A, 8B, and 8C are diagrams illustrating the magnitude of an acting force in a case where an electric field as the unipolar noise output from the unipolar noise output mechanism 32 of FIG. 7 acts on an electric charge in the metal antenna 13.

In a case where an electric charge accumulates on the end surface of the unipolar noise output mechanism 32 (e.g., the end surface of the upper conductor 42), the end surface has a high charge density. In this case, a strong electric field is generated as the unipolar noise, and the unipolar noise as the strong electric field strongly acts on the oscillation of the electric charge in the metal antenna 13.

In contrast, in a case where an electric charge is away from the end surface of the unipolar noise output mechanism 32, the end surface has a low charge density. In this case, a weak electric field is generated as the unipolar noise, and the unipolar noise as the strong electric field weakly acts on the oscillation of the electric charge in the metal antenna 13.

A state in which the end surface of the unipolar noise output mechanism 32 has a high charge density and a strong electric field is generated as the unipolar noise is illustrated in FIG. 8A, and a state in which the end surface of the unipolar noise output mechanism 32 has a low charge density and a weak electric field is generated as the unipolar noise is illustrated in FIG. 8B. A state in which the end surface of the unipolar noise output mechanism 32 has an intermediate charge density and an intermediate electric field is generated as the unipolar noise is illustrated in FIG. 8C.

Figure 9:
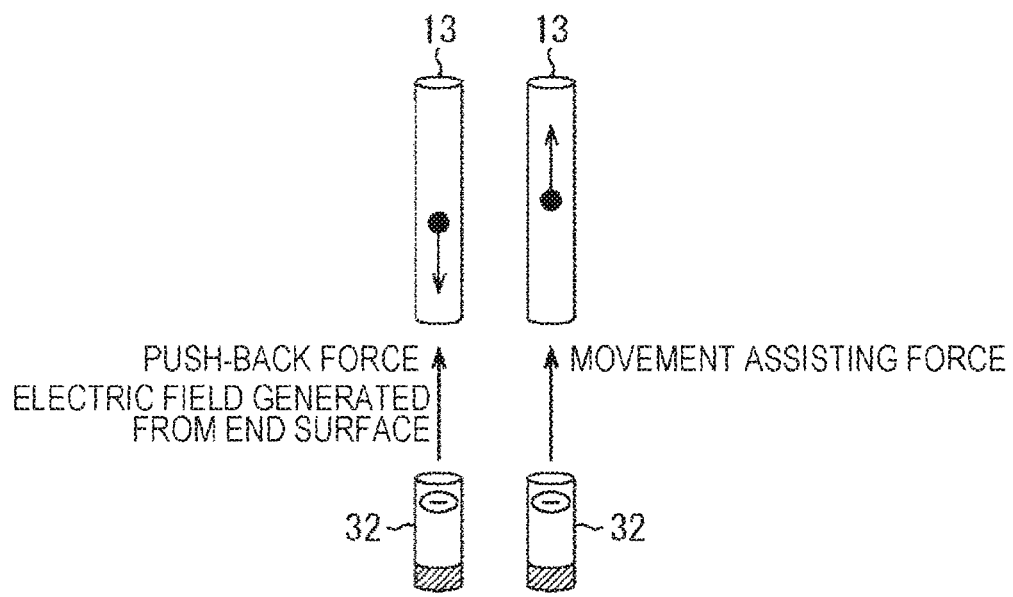
FIG. 9 is a diagram illustrating an action of an electric field as unipolar noise on the oscillation of electrons in the metal antenna 13.

FIG. 9 is a diagram illustrating an action of an electric field as the unipolar noise on the oscillation of electrons in a metal antenna 13.

Depending on a movement direction of the electron oscillating in the metal antenna 13, an electric field as the unipolar noise reversely acts on the oscillation of the electron in the metal antenna 13.

That is, in a case where the electron oscillating in the metal antenna 13 moves in a direction toward the unipolar noise output mechanism 32, the electric field as the unipolar noise acts, for example, to push back the electron oscillating in the metal antenna 13 in a direction away from the unipolar noise output mechanism 32.

In contrast, in a case where the electron oscillating in the metal antenna 13 moves in a direction away from the unipolar noise output mechanism 32, the electric field as the unipolar noise acts, for example, to accelerate the electron oscillating in the metal antenna 13 in a direction away from the unipolar noise output mechanism 32.

As described above, the electric field as the unipolar noise acts on the oscillation of the electron in the metal antenna 13, and the oscillation of the electrons in the plurality of metal antennas 13 is gradually synchronized in phase by the principle of common noise-induced phase synchronization.

Figure 10:
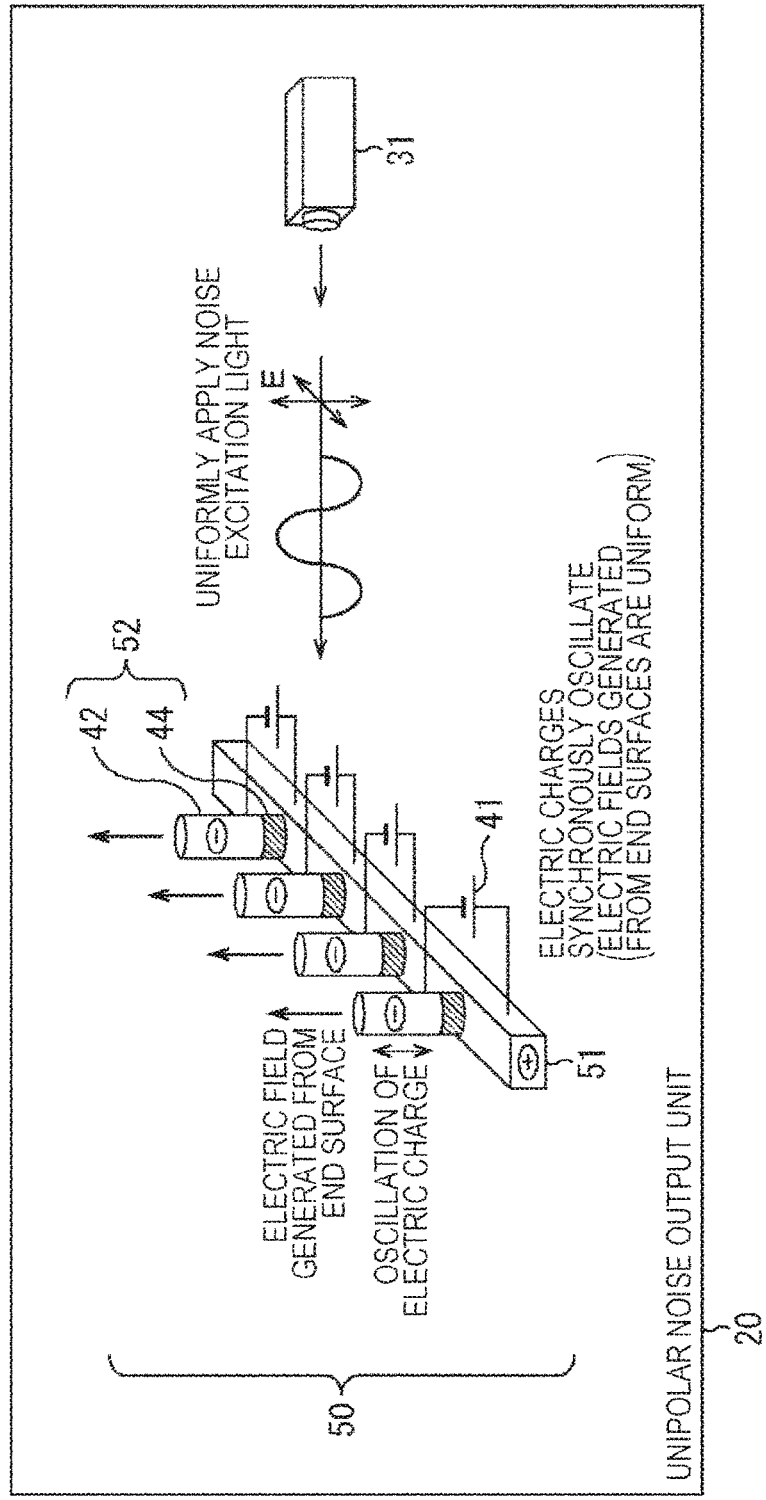
FIG. 10 is a diagram illustrating a third exemplary configuration of the unipolar noise output unit 20.

FIG. 10 is a diagram illustrating a third exemplary configuration of the unipolar noise output unit 20.

Note that, in FIG. 10, portions corresponding to those of FIG. 7 are denoted by the same reference signs, and the description thereof will be appropriately omitted below.

The lower conductors 43 of the plurality of unipolar noise output mechanisms 32 in the unipolar noise output unit 20 of FIG. 7 are configured to be shared in the unipolar noise output unit 20 of FIG. 10.

That is, in FIG. 7, the unipolar noise output unit 20 includes the random electromagnetic wave generation unit 31 and a unipolar noise output mechanism 50.

The unipolar noise output mechanism 50 includes a metal bar 51 and a plurality of output rod units 52.

The number of output rod units 52 to be provided is the same as the number of, for example, a plurality of metal antennas 13 of the light emission mechanism 12. An output rod unit 52 is arranged at one of an upper portion and a lower portion, for example, at a lower portion of a metal antenna 13. Accordingly, the metal antenna 13 is arranged near the conductor 42 constituting the output rod 52, and the conductor 42 is described later.

The output rod unit 52 is irradiated with the noise light output from the random electromagnetic wave generation unit 31. The output rod unit 52 outputs an electric field as the unipolar noise in accordance with irradiation with the noise light, and applies the electric field to the metal antenna 13.

The output rod unit 52 includes the conductor 42 and the dielectric 44.

The dielectric 44 of the output rod unit 52 is held between the conductor 42 of the output rod unit 42 and the metal bar 51, and the output rod unit 52 constitutes a capacitor structure together with the metal bar 51.

In the unipolar noise output unit 20 configured as described above, the noise light output from the random electromagnetic wave generation unit 31 is emitted, as noise excitation light for energizing the unipolar noise, to the unipolar noise output mechanism 50.

In the unipolar noise output mechanism 50, in accordance with the irradiation with the noise light, electric charges in the conductor 42 and the metal bar 51 constituting the capacitor structure oscillates at random, and the charge densities on an end surface of the conductor 42 and a lower surface of the metal bar 51 (lower end surface) are modulated.

Thus, the intensities of electric fields generated from the end surfaces of the conductor 42 and metal bar 51 are modulated at random.

In the unipolar noise output mechanism 50, the conductor 42 and the metal bar 51 are connected to a negative terminal and a positive terminal of the battery 41, respectively.

Therefore, the electric field generated at random from the end surface of the conductor 42 is an electric field of negative polarity, and the electric field generated at random from the end surface of the metal bar 51 is an electric field of positive polarity.

That is, the electric field of negative polarity, as the unipolar noise, is output from the conductor 42, and the electric field of positive polarity, as the unipolar noise, is output from the metal bar 51.

In the unipolar noise output unit 20, the unipolar noise output from the conductor 42 is applied, as the occasional blast of air illustrated in FIG. 6, to the metal antenna 13.

Figure 11:
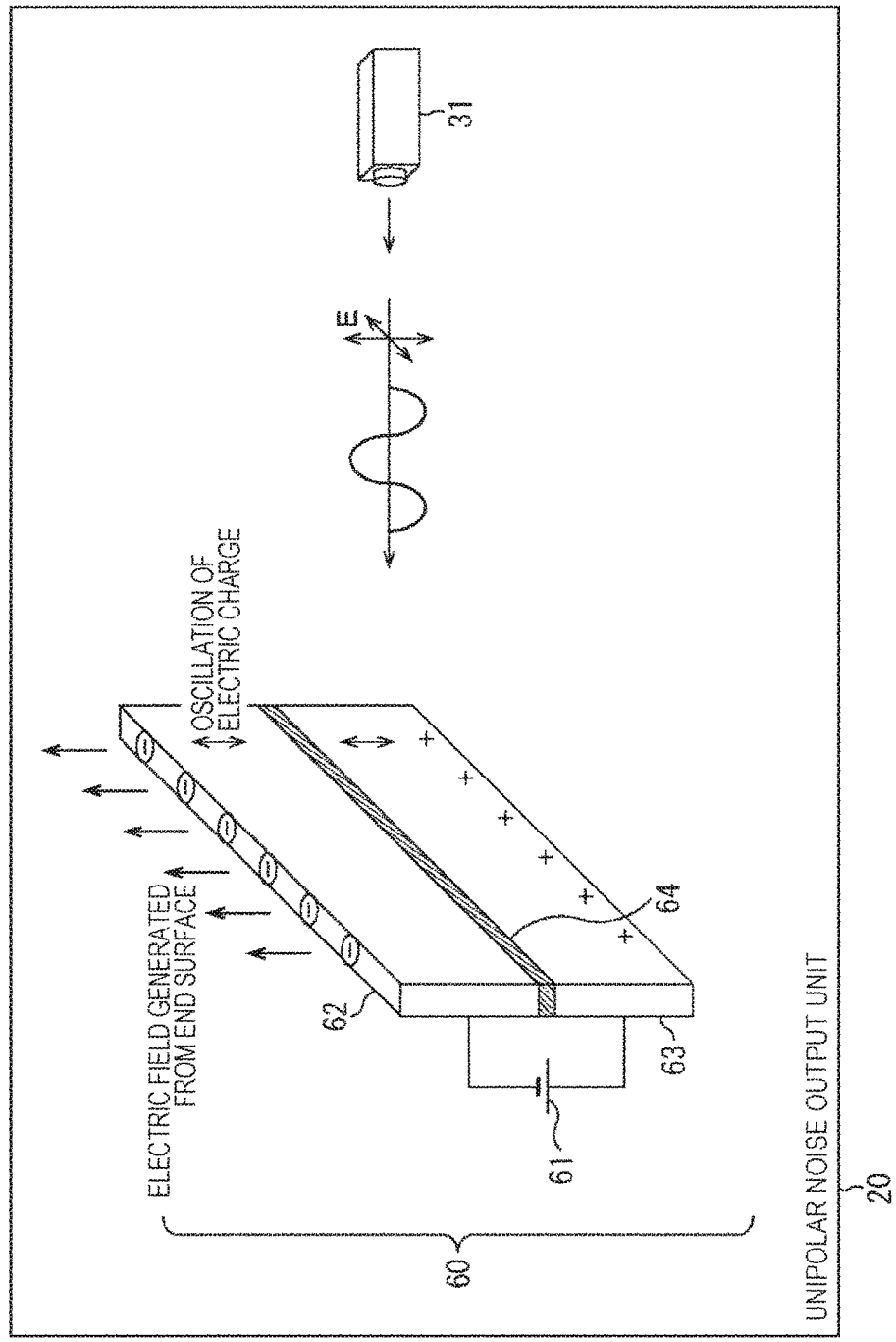
FIG. 11 is a diagram illustrating a fourth exemplary configuration of the unipolar noise output unit 20.

FIG. 11 is a diagram illustrating a fourth exemplary configuration of the unipolar noise output unit 20.

Note that, in FIG. 11, portions corresponding to those of FIG. 7 are denoted by the same reference signs, and the description thereof will be appropriately omitted below.

In FIG. 11, the unipolar noise output unit 20 includes the random electromagnetic wave generation unit 31 and a unipolar noise output mechanism 60.

The unipolar noise output mechanism 60 has a flat plate shape, outputs an electric field as the unipolar noise from the upper surface or the lower surface thereof, and applies the electric field to a metal antenna 13.

Here, an upper surface (lower surface) of the unipolar noise output mechanism 60 having a flat plate shape has a longitudinal length more than the length of the arrangement of a plurality of metal antennas 13 of the light emission mechanism 12.

The unipolar noise output mechanism 60 is arranged above or below, for example, below the arrangement of the plurality of metal antennas 13 of the light emission mechanism 12. Accordingly, the metal antenna 13 is arranged near a conductor 62, one of conductors 62 and 63 constituting the unipolar noise output mechanism 60, and the conductors 62 and 63 are described later.

The unipolar noise output mechanism 60 is irradiated with the noise light output from the random electromagnetic wave generation unit 31. The unipolar noise output mechanism 60 outputs an electric field as the unipolar noise in accordance with irradiation with the noise light, and applies the electric field to the metal antenna 13.

The unipolar noise output mechanism 60 includes a battery 61, the conductors 62 and 63, and a dielectric 64.

The unipolar noise output mechanism 60 has a capacitor structure in which the dielectric 64 is held between the conductors 62 and 63 having a flat plate shape, a negative terminal of the battery 61 is connected to the conductor 62, and a positive terminal of the battery 61 is connected to the conductor 63.

Here, the conductor 62 of the unipolar noise output mechanism 60 is also referred to as an upper conductor 62, and the conductor 63 is also referred to as a lower conductor 63.

In the unipolar noise output unit 20 configured as described above, the noise light output from the random electromagnetic wave generation unit 31 is emitted, as noise excitation light for energizing the unipolar noise, to the unipolar noise output mechanism 60.

In the unipolar noise output mechanism 60, in accordance with irradiation with the noise light, an electric charge in the upper conductor 62 and the lower conductor 63 of the capacitor structure is oscillated at random to modulate charge densities on end surfaces of the upper conductor 62 and the lower conductor 63.

Thus, the intensities of electric fields generated from the end surfaces of the upper conductor 62 and the lower conductor 63, that is, from an upper surface (upper end surface) of the upper conductor 62 and a lower surface (lower end surface) of the lower conductor 63 are modulated at random.

The upper conductor 62 and the lower conductor 63 are connected to the negative terminal and positive terminal of the battery 61, respectively.

Therefore, the electric field generated at random from the upper surface of the upper conductor 62 is an electric field of negative polarity, and the electric field generated at random from the lower surface of the lower conductor 63 is an electric field of positive polarity.

That is, the electric field of negative polarity, as the unipolar noise, is output from the upper conductor 62, and the electric field of positive polarity, as the unipolar noise, is output from the lower conductor 63.

In the unipolar noise output unit 20, the unipolar noise output from the upper conductor 62 is applied, as the occasional blast of air illustrated in FIG. 6, to the metal antenna 13.

In the unipolar noise output unit 20, to apply the unipolar noise output from the upper conductor 62 over the plurality of metal antennas 13 of the light emission mechanism 12, the upper surface (lower surface) of the unipolar noise output mechanism 60 having a flat plate shape has a longitudinal length more than the length of the arrangement of the plurality of metal antennas 13 of the light emission mechanism 12, as described above.

Figure 12:
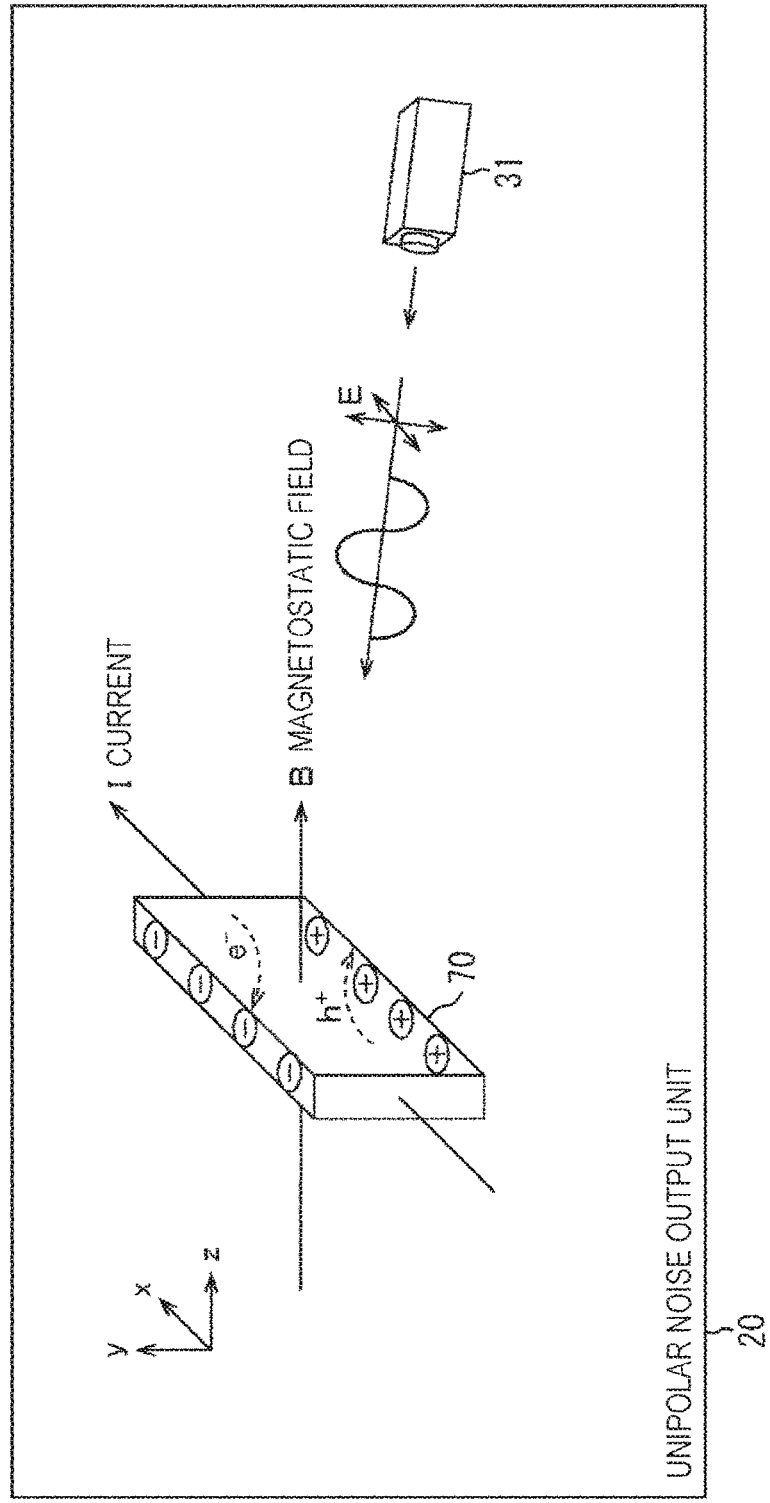
FIG. 12 is a diagram illustrating a fifth exemplary configuration of the unipolar noise output unit 20.

FIG. 12 is a diagram illustrating a fifth exemplary configuration of the unipolar noise output unit 20.

Note that, in FIG. 12, portions corresponding to those of FIG. 7 are denoted by the same reference signs, and the description thereof will be appropriately omitted below.

In FIG. 12, the unipolar noise output unit 20 includes the random electromagnetic wave generation unit 31 and a unipolar noise output mechanism 70.

The unipolar noise output mechanism 70 includes a Hall element having a flat plate shape, has an upper surface or a lower surface from which an electric field as the unipolar noise is output, and applies the electric field to a metal antenna 13.

Here, the upper surface (lower surface) of the unipolar noise output mechanism 70 as the Hall element having a flat plate shape has a longitudinal length, that is, a length in an x-direction in FIG. 12 which is more than the length of the arrangement of a plurality of metal antennas 13 of the light emission mechanism 12.

The unipolar noise output mechanism 70 is arranged above or below, for example, below the arrangement of the plurality of metal antennas 13 of the light emission mechanism 12. Accordingly, the metal antenna 13 is arranged on the positive surface of the unipolar noise output mechanism 70 in a y-direction, that is, one of the positive surface (upper surface) and the negative surface (lower surface) of the unipolar noise output mechanism 70 in the y-direction.

To the unipolar noise output mechanism 70, current I is applied in the positive x-direction, and a magnetic field B is applied in the positive z-direction.

Furthermore, the unipolar noise output mechanism 70 is irradiated with the noise light output from the random electromagnetic wave generation unit 31. The unipolar noise output mechanism 70, as the Hall element, to which current I and magnetic field B are applied, outputs an electric field as the unipolar noise in accordance with irradiation with the noise light, and applies the electric field to the metal antenna 13.

That is, in the unipolar noise output mechanism 70, as the Hall element, to which current I and magnetic field B are applied, the upper surface (the positive surface in the y-direction) is charged to have one of positive polarity and negative polarity, for example, negative polarity, and the lower surface (the negative surface in the y-direction) is charged to have the other of positive polarity and negative polarity, for example, positive polarity.

In the unipolar noise output mechanism 70, in accordance with the irradiation with the noise light, an electric charge is oscillated at random to modulate charge densities on the upper surface and the lower surface.

Thus, the intensities of electric fields generated from the upper surface and the lower surface of the unipolar noise output mechanism 70 are modulated at random.

As described above, the upper surface and the lower surface of the unipolar noise output mechanism 70 are negatively and positively charged, respectively.

Therefore, the electric field generated at random from the upper surface of the unipolar noise output mechanism 70 is an electric field of negative polarity, and the electric field generated at random from the lower surface is an electric field of positive polarity.

That is, the electric field of negative polarity, as the unipolar noise, is output from the upper surface of the unipolar noise output mechanism 70 as the Hall element, and the electric field of positive polarity, as the unipolar noise, is output from the lower surface of the unipolar noise output mechanism 70.

In the unipolar noise output unit 20, the unipolar noise output from the upper surface of the unipolar noise output mechanism 70 is applied, as the occasional blast of air illustrated in FIG. 6, to the metal antenna 13.

Here, to apply the unipolar noise output from the upper surface of the unipolar noise output mechanism 70 over the plurality of metal antennas 13 of the light emission mechanism 12, the plurality of metal antennas 13 of the light emission mechanism 12 is arranged on top of the upper surface of the unipolar noise output mechanism 70.

Note that, in the above description, the charge densities on the upper surface and the lower surface of the unipolar noise output mechanism 70 as the Hall element is modulated by irradiating the unipolar noise output mechanism 70 with the noise light, but, in addition to that, the charge densities on the upper surface and the lower surface of the unipolar noise output mechanism 70 may be modulated by for example, modulating one or both of current I and magnetic field B applied to the unipolar noise output mechanism 70 as the Hall element.

Furthermore, in the unipolar noise output unit 20, a light emission direction in which the noise light is emitted to each of the unipolar noise output mechanisms 32, 50, 60, and 70 (FIG. 7, FIGS. 10 to 12) from the random electromagnetic wave generation unit 31 is not particularly limited. However, the light source 11 and the random electromagnetic wave generation unit 31 need to be arranged in a positional relationship in which the incident light emitted from the light source 11 and the noise light emitted from the random electromagnetic wave generation unit 31 are not opposed to each other.

Furthermore, in the unipolar noise output unit 20, the noise light is emitted from the random electromagnetic wave generation unit 31 to each of the unipolar noise output mechanisms 32, 50, 60, and 70 (FIG. 7, FIGS. 10 to 12) to output the unipolar noise, that is, the electric field intensity of an electric field generated from an end surface of the conductor 42 or 62 or the Hall element is modulated at random, but, in addition to that, each of the unipolar noise output mechanisms 32, 50, 60, and 70 may further mechanically oscillate itself at random by piezoelectric element or the like to modulate the intensity of an electric field generated from an end surface of the conductor 42 or 62 or the Hall element at random. This configuration can constitute the unipolar noise output unit 20 without the random electromagnetic wave generation unit 31.

Furthermore, the intensity of an electric field generated from an end surface of the conductor 42 or 62 or the Hall element may be modulated at random by emitting the noise light to each of the unipolar noise output mechanisms 32, 50, 60, and 70 from the random electromagnetic wave generation unit 31, and mechanically oscillating each of the unipolar noise output mechanisms 32, 50, 60, and 70 at random.

<Exemplary Configuration of Light Emission Mechanism 12 Including Plurality of Metal Antennas 13>

Figure 13:
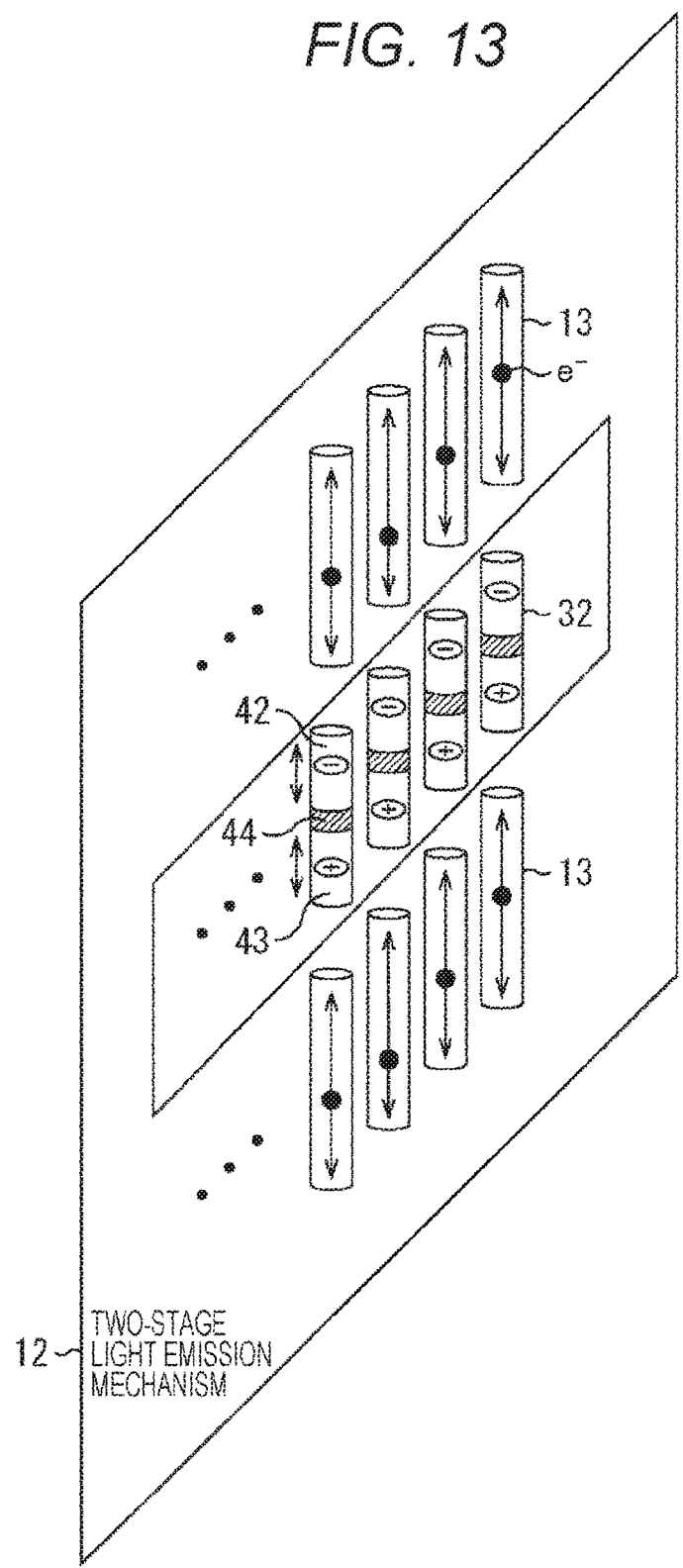
FIG. 13 is a diagram illustrating a second exemplary configuration of a light emission mechanism 12 including a plurality of metal antennas 13.

FIG. 13 is a diagram illustrating a second exemplary configuration of the light emission mechanism 12 including a plurality of metal antennas 13.

Note that, in FIG. 13, portions corresponding to those of FIG. 3 are denoted by the same reference signs, and the description thereof will be appropriately omitted below.

Furthermore, for ease of description, as the unipolar noise output unit 20, for example, the unipolar noise output unit 20 of FIG. 7 including the unipolar noise output mechanism 32 is employed below. However, as the unipolar noise output unit 20, for example, the unipolar noise output unit 20 of FIG. 10, FIG. 11, or FIG. 12 including the unipolar noise output mechanism 50, 60, or 70 may be further employed.

FIG. 3 illustrates a first exemplary configuration of the light emission mechanism 12 including a plurality of metal antennas 13.

The light emission mechanism 12 of FIG. 3 includes a single stage of a plurality of metal antennas 13 horizontally arranged at the same height, but the light emission mechanism 12 of FIG. 13 includes a two-stage structure of piled two stages of a plurality of metal antennas 13 horizontally arranged at the same height.

That is, the light emission mechanism 12 of FIG. 13 has a so-called two-stage light emission mechanism in which pluralities of metal antennas 13 are arranged for the upper conductors (one conductor) 42 and the lower conductors (the other conductor) 43 positioned on both sides of the dielectrics 44 of the unipolar noise output mechanisms 32 having the capacitor structure.

An electric field as the unipolar noise output by modulation of the charge density of a negative charge in an upper conductor 42 is applied to a metal antenna 13 arranged near the conductor 42. Thus, light (electromagnetic wave) radiated from the plurality of metal antennas 13 arranged near the upper conductors 42 is changed to in-phase light, on the basis of the principle of common noise-induced phase synchronization.

Furthermore, an electric field as the unipolar noise output by modulation of the charge density of a negative charge in a conductor 43 is applied to a lower metal antenna 13 arranged near the conductor 43. Thus, light (electromagnetic wave) radiated from the plurality of metal antennas 13 arranged near the lower conductors 43 is changed to in-phase light, on the basis of the principle of common noise-induced phase synchronization.

As described above, since the light emission mechanism 12 is formed as the two-stage light emission mechanism, the unipolar noise can be simultaneously applied to the pluralities of metal antennas 13 having the two-stage structure of the plurality of metal antennas 13 arranged near the upper conductors 42, and the plurality of metal antennas 13 arranged near the lower conductors 43.

Note that in a case where the light emission mechanism 12 is constituted as the two-stage light emission mechanism illustrated in FIG. 13, the number of the plurality of metal antennas 13 arranged near the upper conductors 42 and the lower conductors 43 is not particularly limited.

FIG. 14 is a diagram illustrating a third exemplary configuration of the light emission mechanism 12 including a plurality of metal antennas 13.

Note that, in FIG. 14, portions corresponding to those of FIG. 13 are denoted by the same reference signs, and the description thereof will be appropriately omitted below.

The light emission mechanism 12 of FIG. 14 is constituted by arranging (a matrix of) two two-stage light emission mechanisms 12V and 12H on the same plane.

The two-stage light emission mechanisms 12V and 12H are constituted similarly to the light emission mechanism 12 of FIG. 13.

However, in the two-stage light emission mechanisms 12V and 12H, the pluralities of metal antennas 13 are arranged in different directions.

That is, the two-stage light emission mechanisms 12V and 12H are different from each other in that in the two-stage light emission mechanism 12V, pluralities of metal antennas 13 (and unipolar noise output mechanisms 32) are longitudinally arranged in a predetermined direction, for example, in a vertical direction, but in the two-stage light emission mechanism 12H, pluralities of metal antennas 13 are longitudinally arranged in a direction different from the predetermined direction, for example, in a horizontal direction.

As described above, in the light emission mechanism 12 of FIG. 14, the two-stage light emission mechanisms 12V and 12H having the pluralities of metal antennas 13 arranged in different directions are arranged on the same plane. Thus, a polarization dependency of the light emission mechanism 12 on a polarization direction of the incident light can be reduced to emit higher intensity light.

Note that the light emission mechanism 12 may be configured to position one or both of the two-stage light emission mechanisms 12V and 12H, and a two-stage light emission mechanism in which a plurality of metal antennas 13 is arranged in a direction different from those of the two-stage light emission mechanisms 12V and 12H, that is, for example, a two-stage light emission mechanism (hereinafter, also referred to as an oblique two-stage light emission mechanism) in which a plurality of metal antennas 13 is arranged 45 degrees apart from each other on the same plane.

In a case where both of the two-stage light emission mechanisms 12V and 12H, and the oblique two-stage light emission mechanism are arranged on the same plane to constitute the light emission mechanism 12, the polarization dependency of the light emission mechanism 12 can be further reduced to emit the higher intensity light.

Furthermore, in FIG. 14, the two two-stage light emission mechanisms 12V and 12H are arranged on the same plane to constitute the light emission mechanism 12, but the light emission mechanism 12 may be constituted by arranging a larger number of two-stage light emission mechanisms 12V and 12H in a matrix on the same plane.

FIG. 15 is a diagram illustrating a fourth exemplary configuration of the light emission mechanism 12 including a plurality of metal antennas 13.

Note that, in FIG. 15, portions corresponding to those of FIG. 14 are denoted by the same reference signs, and the description thereof will be appropriately omitted below.

The light emission mechanism 12 of FIG. 15 is constituted by arranging a total of nine two-stage light emission mechanisms 12V and 12H are arranged in matrix on the same plane.

In the light emission mechanism 12 of FIG. 15, the two-stage light emission mechanisms 12V and 12H are arranged alternately vertically and horizontally in a checkerboard pattern.

As described above, a larger number of two-stage light emission mechanisms 12V and 12H constitute the light emission mechanism 12, and higher intensity light can be emitted.

Note that, in FIG. 15, the light emission mechanism 12 is constituted by the two-stage light emission mechanisms 12V and 12H, but the light emission mechanism 12 may be further constituted by, for example, one or both of the two-stage light emission mechanisms 12V and 12H, and the oblique two-stage light emission mechanism illustrated in FIG. 14.

Furthermore, in FIG. 15, the total of nine two-stage light emission mechanisms 12V and 12H are arranged in a 3×3 matrix (columns×rows), but the light emission mechanism 12 may be constituted by arranging the two-stage light emission mechanisms of less than nine or more than nine (the two-stage light emission mechanism 12V or 12H, the oblique two-stage light emission mechanism, or the like) in an n×m matrix.

In accordance with the number of two-stage light emission mechanisms constituting the light emission mechanism 12, the size of the light source of the light radiated from the light emission mechanism 12 can be appropriately adjusted.

Furthermore, the light emission mechanisms 12 illustrated in FIG. 3, FIG. 13, and FIG. 15 can be arranged in multiple stages. In a case where the light emission mechanisms 12 are arranged in multiple stages, the intensity of light is repeatedly increased using light radiated from a light emission mechanism 12 of a preceding stage, as the incident light in the multiple stages of the light emission mechanisms 12, and higher intensity light can be obtained.

Furthermore, in the light emission mechanism 12, an arrangement pattern in which a plurality of metal antennas 13 are arranged is not particularly limited, and any arrangement pattern may be appropriately employed in consideration of ease of manufacture or the like.

<Exemplary Arrangement Patterns of Plurality of Metal Antennas 13>

FIGS. 16A, 16B, 16C, 16D, and 16E are plan views of exemplary arrangement patterns of a plurality of metal antennas 13 in the light emission mechanism 12.

For example, as illustrated in FIG. 16A, in the light emission mechanism 12, a plurality of metal antennas 13 may be arranged in line (when viewed from above).

Furthermore, for example, as illustrated in FIG. 16B, a plurality of metal antennas 13 may be arcuately arranged.

Furthermore, for example, as illustrated in FIG. 16C, a plurality of metal antennas 13 may be arranged in a grid pattern.

Furthermore, for example, as illustrated in FIG. 16D, the arrangement of a plurality of metal antennas 13 may be obtained by alternately shifting columns of metal antennas 13 of the metal antennas 13 in FIG. 16C in position (by ½ of an interval between metal antennas 13).

Furthermore, for example as illustrated in FIG. 16E, a plurality of metal antennas 13 may be arranged so that at least two metal antennas 13 are arranged above one unipolar noise output mechanism 32.

Herein, embodiments of the present technology is not intended to be limited to the above embodiments, and various modifications and variations may be made without departing from the scope and spirit of the present technology.

Furthermore, it is noted that the effects described herein are by way of example only and not limited to the description, and there may be further additional effects.

It is noted that the present technology may also include the following configurations.

<1>

A light emitting device including:

a light emission mechanism including a plurality of rod-shaped metal antennas to radiate light obtained by oscillation of electrons in each metal antenna, caused by incident light; and a unipolar noise output unit that applies unipolar noise to the metal antenna.

<2>

The light emitting device according to <1>, in which an action time in which the unipolar noise continuously acts on the metal antenna is a time being ½ or less of a period of the incident light.

<3>

The light emitting device according to <1> or <2>, in which the unipolar noise output unit includes:

a unipolar noise output mechanism that outputs the unipolar noise in accordance with modulation of a charge density at an end surface; and a random electromagnetic wave generation unit that generates a random electromagnetic wave, the random electromagnetic wave modulating a charge density at an end surface of the unipolar noise output mechanism.

<4>

The light emitting device according to <3>, in which the unipolar noise output mechanism includes a capacitor structure having a dielectric held between conductors.

<5>

The light emitting device according to <4>, in which the light emission mechanism includes a two-stage light emission mechanism where the metal antennas are arranged at one conductor and the other conductor both positioned on both sides of the dielectric.

<6>

The light emitting device according to <5>, in which the light emission mechanism is constituted by matrix arrangement of:

the two-stage light emission mechanism including the metal antennas longitudinally arranged in a predetermined direction, and the two-stage light emission mechanism including the metal antennas longitudinally arranged in a direction different from the predetermined direction.

<7>

The light emitting device according to any of <1> to <5>, in which the plurality of metal antennas is longitudinally arranged in the same direction.

<8>

A light emitting method including applying unipolar noise to a plurality of rod-shaped metal antennas of a light emission mechanism, the light emission mechanism including the plurality of metal antennas, radiating light by oscillation of electrons in the metal antennas caused by incident light.

REFERENCE SIGNS LIST

11 Light source
12 Light emission mechanism
12H, 12V Two-stage light emission mechanism
13 Metal antenna
20 Unipolar noise output unit
21 Unipolar noise generation unit
22 Metal bar
31 Random electromagnetic wave generation unit
32 Unipolar noise output mechanism
41 Battery
42, 43 Conductor
44 Dielectric
50 Unipolar noise output mechanism
51 Metal bar
60 Unipolar noise output mechanism
61 Battery
62, 63 Conductor
64 Dielectric
70 Unipolar noise output mechanism

The invention claimed is:

1. A light emitting device comprising:
a light emission mechanism including a plurality of rod-shaped metal antennas to radiate light obtained by oscillation of electrons in each metal antenna caused by incident light; and
a unipolar noise output unit that applies unipolar noise to the plurality of rod-shaped metal antenna.

2. The light emitting device according to claim 1, wherein an action time in which the unipolar noise continuously acts on the metal antenna is a time being ½ or less of a period of the incident light.

3. The light emitting device according to claim 1, wherein the unipolar noise output unit includes:
a unipolar noise output mechanism that outputs the unipolar noise in accordance with modulation of a charge density at an end surface; and
a random electromagnetic wave generation unit that generates a random electromagnetic wave, the random electromagnetic wave modulating a charge density at an end surface of the unipolar noise output mechanism.

4. The light emitting device according to claim 3, wherein the unipolar noise output mechanism includes a capacitor structure having a dielectric held between conductors.

5. The light emitting device according to claim 4, wherein the light emission mechanism includes a two-stage light emission mechanism where the metal antennas are arranged at one conductor and other conductor both positioned on both sides of the dielectric.

6. The light emitting device according to claim 5, wherein the light emission mechanism is constituted by matrix arrangement of:
the two-stage light emission mechanism including the metal antennas longitudinally arranged in a predetermined direction, and
the two-stage light emission mechanism including the metal antennas longitudinally arranged in a direction different from the predetermined direction.

7. The light emitting device according to claim 1, wherein the plurality of rod-shaped metal antennas is longitudinally arranged in the same direction.

8. A light emitting method comprising
applying unipolar noise to a plurality of rod-shaped metal antennas of a light emission mechanism, the light emission mechanism including the plurality of rod-shaped metal antennas, radiating light by oscillation of electrons in the metal antennas caused by incident light.

* * * * *